Figure 4:
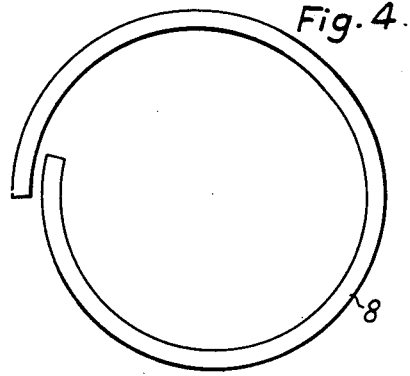

May 15, 1962   E. G. BIANCA ETAL   3,034,209
METHOD OF MAKING TAPERED TUBULAR SECTIONS
Filed July 30, 1957   7 Sheets-Sheet 1
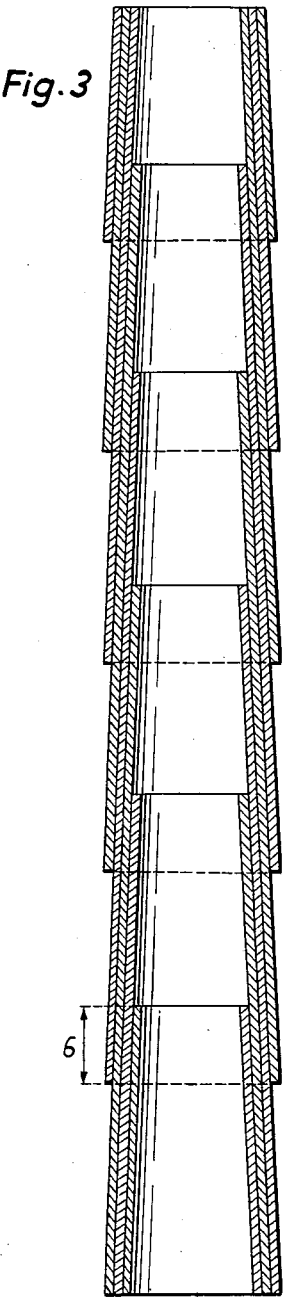
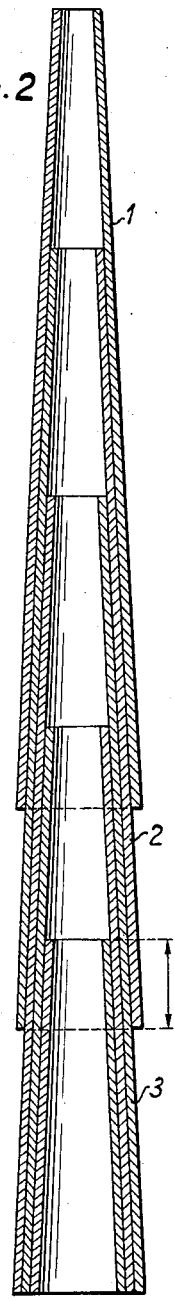
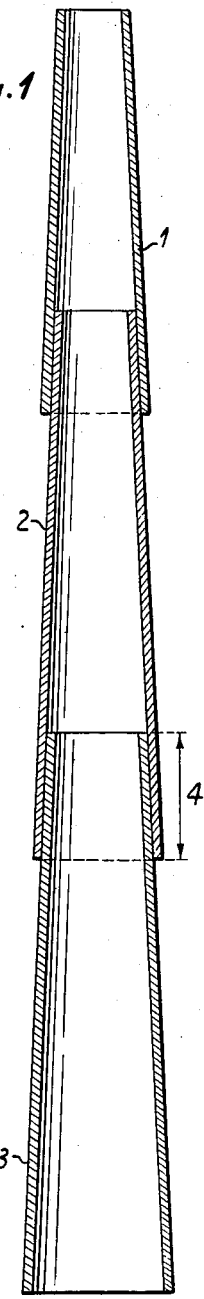
INVENTORS:
EDOARDO GIUSEPPE BIANCA
KARL DIEBOLD
BY

INVENTORS:
EDOARDO GIUSEPPE BIANCA
KARL DIEBOLD

May 15, 1962   E. G. BIANCA ETAL   3,034,209
METHOD OF MAKING TAPERED TUBULAR SECTIONS
Filed July 30, 1957   7 Sheets-Sheet 3
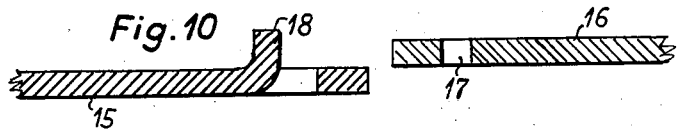
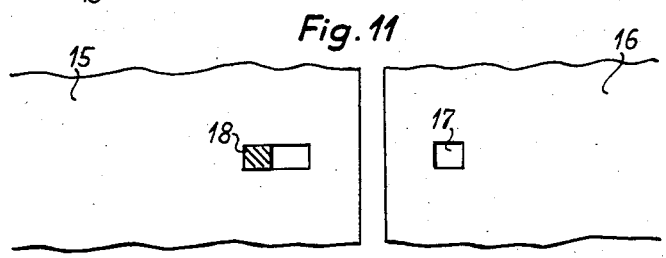
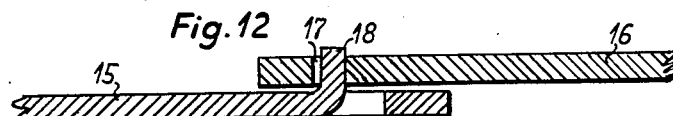
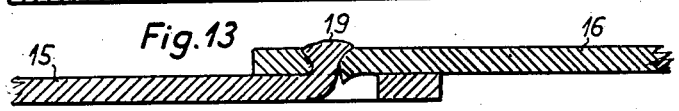
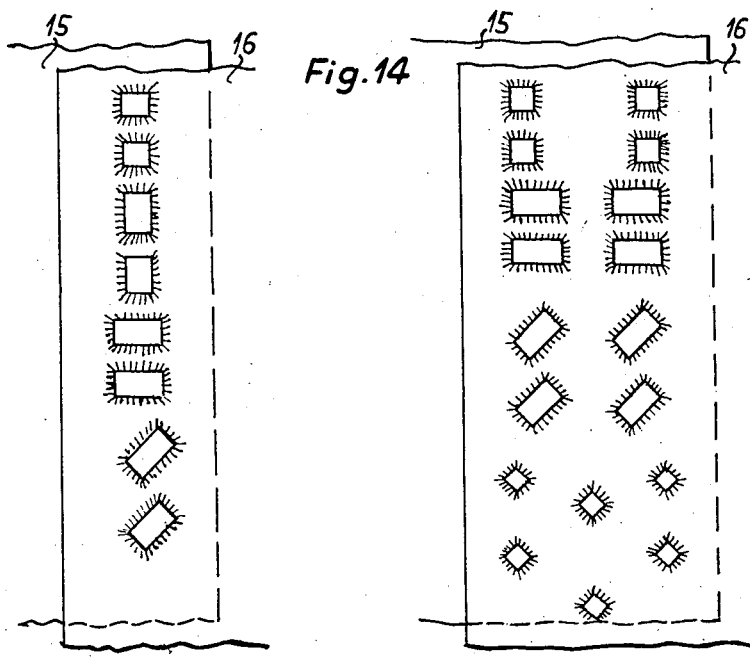
INVENTORS:
EDOARDO GIUSEPPE BIANCA
KARL DIEBOLD
BY Leon M. Strauss May 15, 1962 E. G. BIANCA ETAL 3,034,209
METHOD OF MAKING TAPERED TUBULAR SECTIONS
Filed July 30, 1957 7 Sheets-Sheet 4
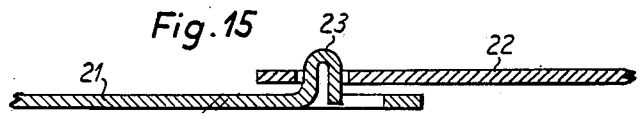
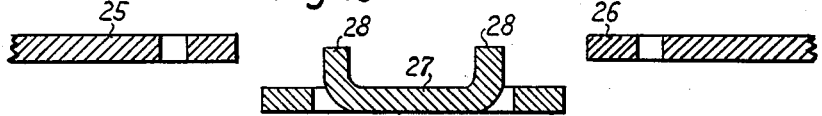
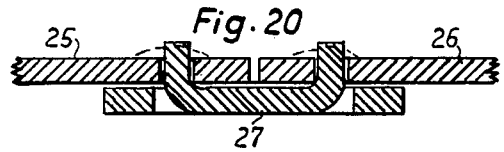
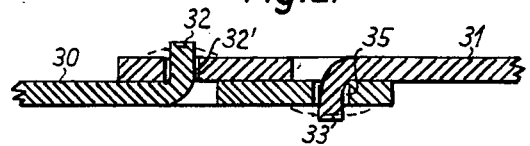
INVENTORS:
EDOARDO GIUSEPPE BIANCA
KARL DIEBOLD
BY
Leon M. Strauss
AGT

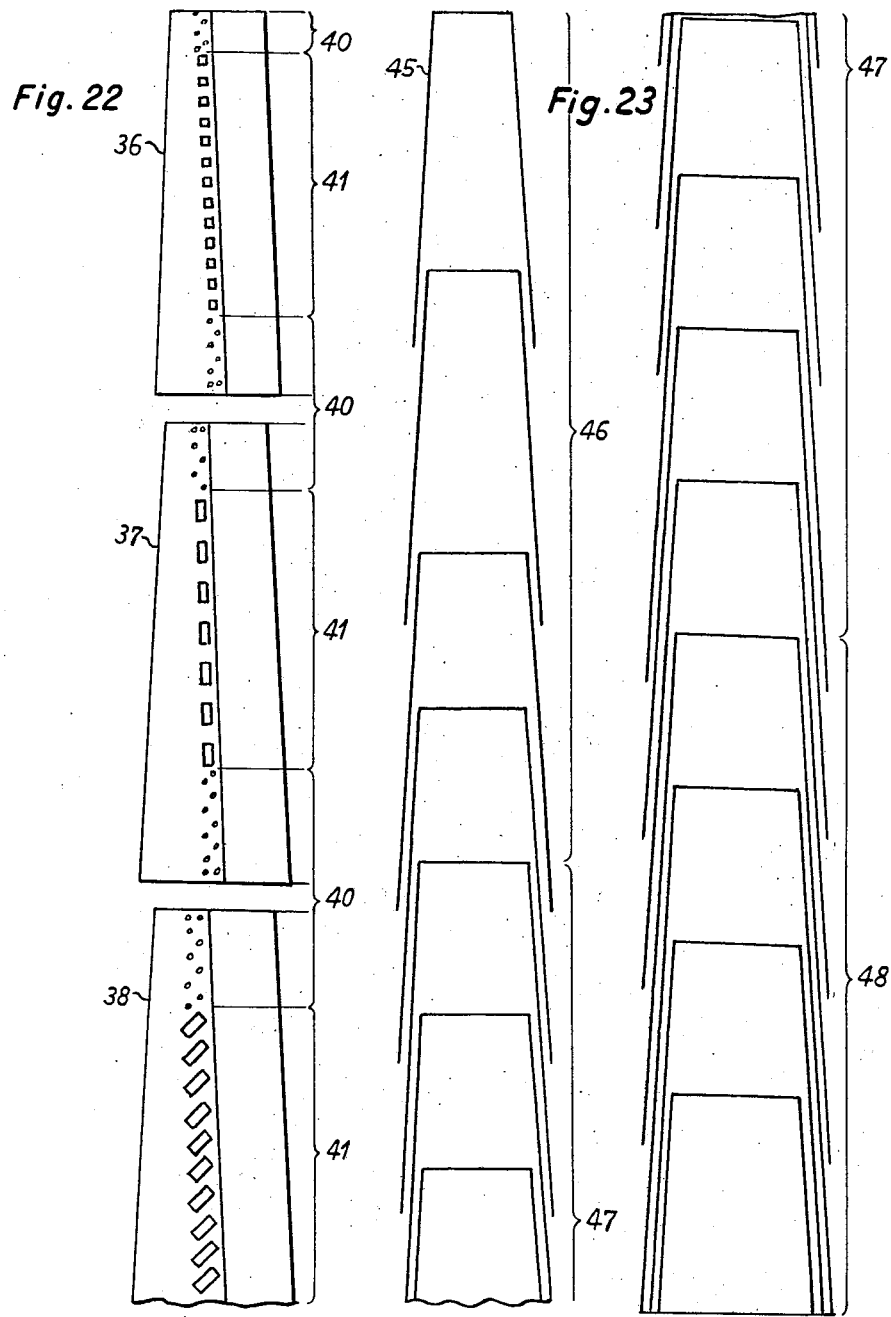

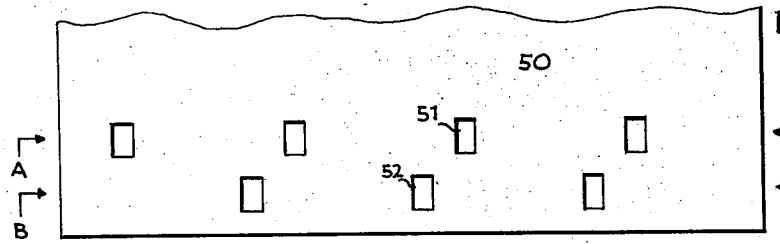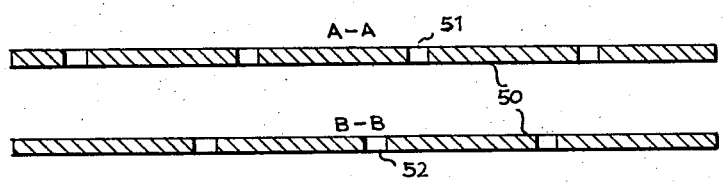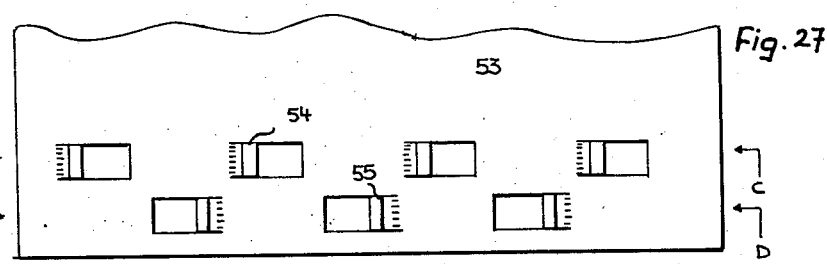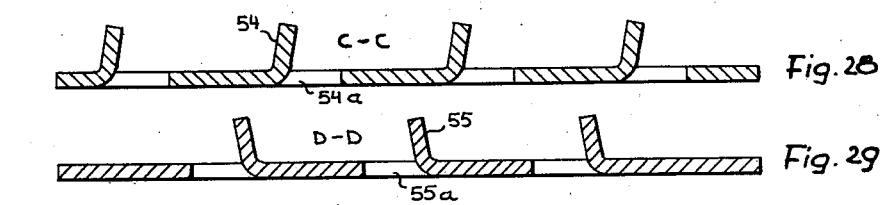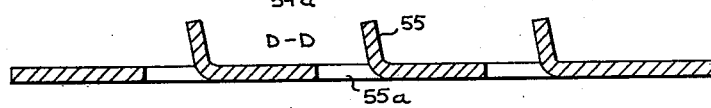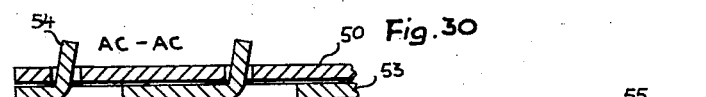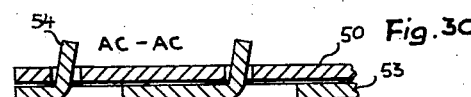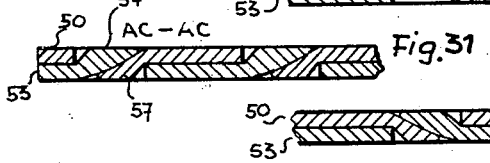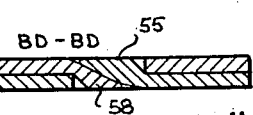

May 15, 1962 E. G. BIANCA ETAL 3,034,209
METHOD OF MAKING TAPERED TUBULAR SECTIONS
Filed July 30, 1957 7 Sheets-Sheet 7

INVENTORS:
EDOARDO GIUSEPPE BIANCA
KARL DIEBOLD
BY Leon M. Strauss
AGT

United States Patent Office 3,034,209
Patented May 15, 1962

3,034,209
METHOD OF MAKING TAPERED TUBULAR SECTIONS
Edoardo Giuseppe Bianca, Rosenweg 11, Zollikon, Switzerland, and Karl Diebold, Dorfstr. 37, Kilchberg, Switzerland
Filed July 30, 1957, Ser. No. 675,094
Claims priority, application Austria July 31, 1956
1 Claim. (Cl. 29—432)

This invention relates to a method of producing tapered tubular sections from metallic sheet material, which are fitted into each other by overlapping joints in order to form a tubular mast, which is adapted to be employed as support for electric power lines, telephone lines, antennas, lighting projectors, flags, etc. and generally as a supporting structural element of for other analogous purposes. The tapered tubular sections are produced by shaping trapezoidally cut ordinary sheet material and uniting the sheet material by longitudinal seams.

Various known methods have been tried to make tapered tubular masts from ordinary sheet material, as the known tube-making processes are either not applicable or extremely expensive in this case. Flame and electric welding have been tried, but this is done easily and cheaply only with low carbon steel sheet material, resulting in heavy masts which, furthermore, need an efficient protection against corrosion. Heavy zinc coating by the hot dipping process is the only acceptable solution, but is expensive and often makes for bad and unsecure joints owing to solidified droplets in the wrong places. Electric seam-welding of corrosion resistant aluminium alloys can only be satisfactorily carried out in an inert artificial atmosphere and with automatic machines. This is generally expensive, delicate and erratic for sheet of less than 1/8" and difficult, because of heat conduction, for sheet over 1/4". For automatic welding seams must be very accurately and evenly set, which in turn needs complicated jigs and special clamping devices of very awkward construction, owing to the great length (10 to 15 ft.) in relation to the diameter, that may be as low as 2½ in. The existing machines for tube-making from sheet are built for constant diameters and are not applicable to tapered sections. Lastly, welding of the most indicated Al—Mg, non-heat-treatable, cold-rolled alloys reduces their ultimate strength to about 60% and, what counts more, their yield point to about 40%. A further drawback is present since the structural changes in the weld and adjacent zones diminish sensibly the resistance to corrosion.

Another known method avoids welding by employing reciprocally engaging, so called "congruent" tongues in a symmetrical, two-sided arrangement, punched out of each of the two sheets. As these tongues become stressed for bending, the connection is extremely weak in relation to the full section. Therefore these seams tend to tear apart in the outer overlapping end, which is the reason why with this system a thicker gauge of sheet must be employed, resulting in a waste of material. Finally, the operation of engaging or meshing these "congruent" tongues is so difficult and delicate in the length of seams practically necessary (at least 10 ft.) that the cost of labour is in no proportion to the result. In fact, the industrial application of the "congruent tongue" method had to be abandoned after very heavy losses.

To cite all alternatives, plain riveting could be considered, if the unfavourable diameter/length ratio would not render introduction of rivets impossible, except at the extremes. Aircraft-type blind riveting methods would have to be resorted to, but here again, cost would be prohibitive for practical applications. Some other known methods of uniting sheets are not applicable, as they cannot produce flat, flush seams.

All the above inconveniences are avoided by the present method, which resides in producing tapered segments from one or more conically shaped sheets, united by one or more longitudinal seams, to form a mast by fitting the sections into each other, the seams being connected by cutting openings or holes on one of the edges or margins, punching and erecting rivet shanks out of the proper metal of the other edge or margin, introducing said shanks into the corresponding said openings of the other edge and finally locking the seams by riveting. At the easily accessible and highly stressed outer portions, standard known methods of uniting the seams may be used in combination with the above method.

Figure 5:
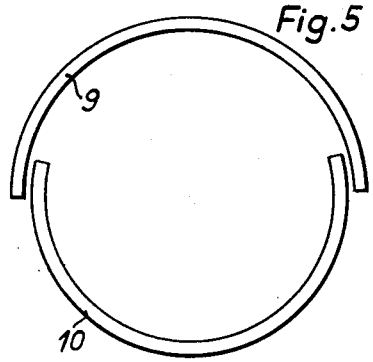
Figure 6:
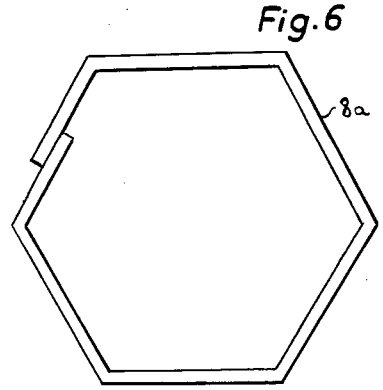
Figure 7:
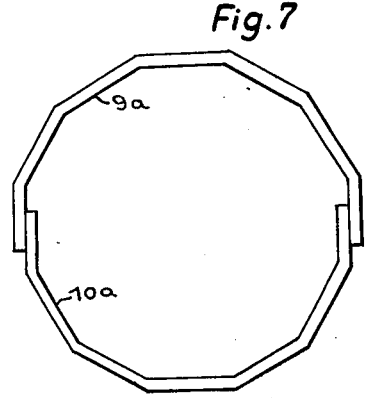
Figure 8:
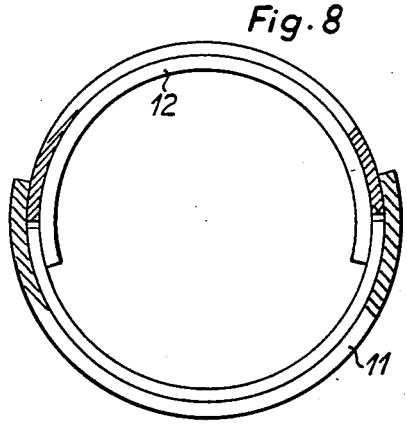
Figure 9:
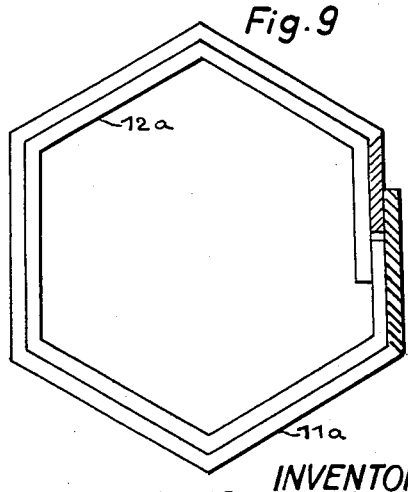

In the accompanying drawings there are illustrated a few examples of the method. The figures show:

FIG. 1 a longitudinal section of an ordinary tapered mast, composed of tapered sections,
FIG. 2 a longitudinal section of a multi-layer tapered mast,
FIG. 3 a longitudinal section of a multi-layer, constant diameter tubular mast,
FIG. 4 a cross section of a single-seam tubular section,
FIG. 5 a cross section of a double-seam tubular section (composed of two shells),
FIGS. 6 and 7 the equivalents resp. to FIGS. 4 and 5, with polygonal cross sections,
FIGS. 8, 9 how two consecutive round resp. polygonal tubular sections are fitted into each other.
FIGS. 10, 11, 12 and 13 the various components of the seam connection, in section, in plan view, plugged in and finally riveted.
FIG. 14 some possibilities of disposition of the shanks,
FIGS. 15, 16 a cross section of T-rivets, plugged in and riveted,
FIGS. 17, 18 a flush finished type, plugged in and riveted, in cross section,
FIGS. 19, 20 a cross section of the seam with connection by a separate cover-strip (for extra hard sheet),
FIG. 21 a double seam, composed of two single seams in a relative position of 180°,
FIG. 22 a few examples of compound connection (riveted/spot welded),
FIG. 23 an assembly of a multi-layer progressive structure,
FIGS. 24–33 plan views and cross-sections of another example with its production stages of which:
24–26 the sheet's edge containing only the openings for passing the shanks,
27–29 the other sheet's edge with the shanks erected,
30, 32 the two parts plugged together,
31, 33 the finished seam after beating,
FIG. 34 an example of structural assembly of a double-tapered tubular mast.

The standard assembly as shown in FIG. 1, is limited in its size and load-carrying capacity by the sheet gauge that can be easily and economically connected by a seam. For bigger sizes or higher bending stresses, the structure of FIG. 2 provides the possibility of obtaining a higher moment of resistance without losing the advantage of working sheet of the most convenient gauge, nor the possibility of assembling high masts, with tubular sections of fractional length, by conveniently determining the choice of layers and sheet gauge. Utmost economy in material and cost is obtained and at the same time a progressive stiffness, in relation to stressing moments, will avoid local concentration of strains and therefore metal fatigue.

Practical experiments of the inventors have shown that in the multi-layer structure of tubular mast, an overlap of 30% of the corresponding diameter will be sufficient to avoid weak local zones, although theoretical considerations would seem to require more. This sectionalised multi-layer structure, in connection with its overlap allows for small relative movements under strong bending stress. This again produces internal friction that exerts a powerful damping effect, making these masts many times more storm resisting than the single shell welded type, which in practice has shown some unexpected failures, due to undamped swinging under severe weather conditions.

FIG. 3 shows a multi-layer mast of constant diameter, particularly useful where a constant moment of resistance is required. Such a structure is obtained by employing all tubular sections of the same type, in which the taper is equal to twice the sheet thickness multiplied by the number of layers.

The tubular sections may be built up from a single sheet (FIGS. 4, 6), or from two shells (FIGS. 5, 7) or still more, in accordance with diameter, sheet gauge, etc.

The seam-overlaps of successive sections 11, 12 (FIGS. 8, 9) are placed in such a relative position that they mesh flush, obtaining thus at the same time a lock against torsional stresses.

The shaping of the shells cannot be carried out by rolling, owing to the taper. Die-pressing is too expensive for the comparatively small quantities, so it must be done on a sheet flanging-press by successive strokes on the generating lines, about ½" apart on the circumference. Giving the tubular elements a polygonal cross section (FIGS. 6, 7, 9) cuts down shaping costs by needing fewer strokes.

The method of riveting consists in that holes 17 are punched into the margin of sheet 16 (FIGS. 10-13) whilst in the second margin (of the other sheet) 15 shanks 18 are formed by a combined process of cutting the contour of the shank (but leaving its root) and erecting the same. Shanks 18 are then introduced or "plugged" into the corresponding openings 17 (FIG. 12) of sheet 16 and riveted to lock the two parts by head 19 (FIG. 13).

According to the material employed (usually light alloys) the shanks are given a square or slightly oblong cross section. Shanks may be disposed in one or more rows, staggered and at different angles as illustrated in FIG. 14.

It is essential to this method that, shanks being integral with the sheet, any length of seam with any number of shanks may be plugged in with the greatest ease and in shortest time without any need for access to the interior except for an internal supporting bar. Riveting equally is fast as there is a great number of small rivets that can be locked by a few rapid passes with a pneumatic or electric hammer.

This method has proved itself apt to be carried out easily and economically for sheet thickness from at $\frac{1}{16}$" or $\frac{3}{32}$" up to ¼" with aluminium alloys, and indistinctly for the layout of FIGS. 12, 13, FIGS. 17, 18, FIGS. 19, 20, 21 or FIGS. 24 to 33. When thinner sheet is to be employed, down to say $\frac{1}{32}$", layout of FIGS. 15, 16 is preferable. Shanks are made longer and folded back about halfway, leaving a hollow in the middle. When the heads are beaten, the hollow makes them spread and form a T-shaped lock.

In case very high-strength alloy (and consequently very hard) sheet is to be employed, the integral rivet shanks will either not support the bending at the root without forming cracks, or will not permit riveting. The method is then applied as shown in FIGS. 19, 20, where the two sheet edges to be joined butt against each other instead of overlapping. Both margins 25, 26 contain holes only, that can be punched even into the hardest of materials without damage to the same. The necessary overlap is given by a common cover-strip 27, containing shanks only, and which is made of softer material to permit riveting.

The lower specific strength of this material is compensated by a greater thickness, which has hardly any bearing on total weight or cost as it concerns only a small part of the total surface.

Furthermore, the mechanical operations of the process may be simplified by adopting the layout of FIG. 21. Two seams in accordance with this method are disposed "push-pull" fashion in 180°-inverted positions. This permits to use a single combined punching tool for the edges of both sheets.

A particularly strong seam connection, obtained by a layout similar to the one of FIGS. 17, 18, is shown by FIGS. 24 to 33 in all the stages of production. In sheet 50 two rows (A—A, B—B) of holes 51, 52 are punched in an irregularly staggered fashion. In corresponding position shanks 54, 55 are punched in rows C—C, D—D on the other sheet. These shanks are made longer than in the previous examples and erected to less than the rectangular position, inclinations being in opposite directions in the two rows.

Shanks 54, 55 are then introduced in holes 51, 52. When subsequently beaten down they first fold back on the side of the smaller angle and whilst a riveting action takes place of these heads, the underlying portion of sheet 50 is partially cut out by and pressed into the openings 54a, 55a (produced previously and left over by the process of forming shanks 54, 55). Two distinct locking connections are thus produced, i.e.:

(1) The secondary tongues 57, 58 belonging to sheet 50 are cut out by the proper edges of openings 54a, 55a and forced into place so tightly that they will rather snap off than slip out.

(2) Shanks 54, 55 whilst producing operation 1, as if they were a punching tool, take the place left vacant by tongues 57, 58 and since the width is identical, lock on their sides into sheet 50 by the expanding action of riveting. Practical tests have shown that the most efficient conditions are obtained when the length of shanks 54, 55 is such as to produce secondary tongues with about square heads.

All known tubular masts made from tapered tubular sections are subject to one basic drawback: the longitudinal seams are subjected to comparatively small transverse forces in their middle portion (between overlaps), but in the overlapping junctions the bending forces produce considerable tangential (and therefore transversal) resultant forces. The necessary compromise is then either too heavy a sheet gauge or an expensive seam-connection. These drawbacks are avoided completely by applying the present method of uniting sheets only in the middle portion, between overlaps, of each tubular section, whereby one of the simpler and cheaper layouts can be used. The two extreme portions of the seam, corresponding to the overlaps, are then connected by other means, preferably electric spot-welding, that could not possibly be applied to the interior part. In fact, electric spot welding is in principle the most convenient process and permits a very high strength coefficient, but needs high intensities (up to 60,000 amps. in this case) and an afterpressure of up to 1.2 tons per point. This can easily be applied to the extreme portions but is impossible to realise in the center portion of the tubular sections.

Different examples of such a combination-method are shown by 36, 37, 38 in FIG. 22. Both an economy of 60-80% in the cost of uniting sheets and an economy of up to 20-30% in materials can be obtained.

Mast 45 in FIG. 23 is shown in two portions and demonstrates how the assembly can be used to obtain a proper relation between stress and moment of resistance in any point, without abandoning the sectional construction. Zone 46 is single layer, 47 is double layer and 48 is triple layer. Very strong masts can be made in this manner, without losing the advantage of low unit weights of tubular sections, espcially for transport.

Figure 34:
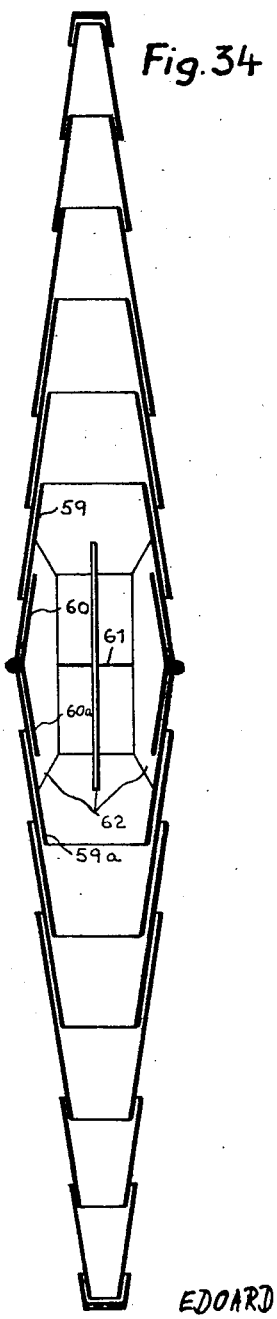

The mast of FIG. 34 shows the application of this principle to a double-taper, or needle type mast, built especially to resist compression. The center section 59 is reinformed by second layer 60, the whole being united in the center line 61. As in this place welding can hardly be supplanted, longitudinal reinforcement ribs 62 transfer stress into the portions not weakened by the transverse seam 61.

In connection with the multi-layer method it is important that in the case of aluminium alloys electric spot welding is practically limited to sheet thickness of 1/8" or little more, owing to its great thermal and electric conductivity. The described method therefore represents the only means of making good use of this most convenient and economic way of uniting sheet, at least as part and in combination with other processes.

Various changes and modifications may be made without departing from the spirit and scope of the present invention and it is intended that such obvious changes and modifications be embraced by the annexed claim.

Having thus described the invention, what is claimed as new and desired to be secured by Letters Patent is:

Method of making tapered tubular sections comprising the steps of shaping a metallic sheet to have the surface of a conical segment and two margins to be united, cutting openings in a first margin of said metallic sheet by removing small areas of metal from the sheet, punching out of rivet shanks on the second margin of said metallic sheet with said rivet shanks being longer than the thickness of said metallic sheet and producing thereby relatively large openings in said sheet, erecting said rivet shanks, passing said shanks through the corresponding openings in the first margin of said metallic sheet so that said shanks extend beyond said openings in said first margin, folding down said shanks flat on the side of said first margin, then beating down said shanks against said first margin while simultaneously cutting out portions of said first margin and press-fitting said portions into the underlying relatively large openings substantially filling said relatively large openings.

References Cited in the file of this patent
UNITED STATES PATENTS

| | | |
|---|---|---|
| 232,360 | Milliken | Sept. 21, 1880 |
| 2,036,771 | Pfistershammer | Apr. 7, 1936 |
| 2,042,883 | Delaney | June 2, 1936 |
| 2,149,918 | Komorous | Mar. 7, 1939 |
| 2,214,480 | Schecter | Sept. 10, 1940 |
| 2,663,072 | Pfistershammer | Dec. 22, 1953 |
| 2,912,075 | Pfistershammer | Nov. 10, 1959 |
| 2,916,181 | Pfister et al. | Dec. 8, 1959 |